Patented Jan. 23, 1934

1,944,153

UNITED STATES PATENT OFFICE 1,944,153

PRODUCTION OF DIOLEFINES

Martin Mueller-Cunradi, Ludwigshafen-on-the-Rhine, Germany, assignor to I. G. Farbenindustrie Aktiengesellschaft, Frankfort-on-the-Main, Germany, a corporation of Germany No Drawing. Application September 27, 1929, Serial No. 395,752, and in Germany October 4, 1928

8 Claims. (Cl. 260—171)

This invention relates to improvements in the manufacture and production of diolefines such as butadiene, isoprene or dimethylbutadiene from 1.3-butylene glycols.

I have found that diolefines can be obtained with a particularly good yield and in a high state of purity by treating the corresponding butylene glycol at an elevated temperature together with an addition of water vapor with a catalyst comprising an oxide of a metal or a non-metal as such or in the form of the corresponding compounds such as hydroxides or carbonates, nitrates, or oxalates furnishing the said oxides under the conditions of working, which oxide has a dehydrating action (see Sabatier and Reid, Catalysis in Organic Chemistry, Sec. 687 to 727, the Library Press Limited 1923). As examples of such oxides may be mentioned aluminum oxide, tungstic oxide, thorium oxide, phosphoric acid, silicon dioxide and mixtures comprising them, or mixtures of these with one another or compounds thereof with other oxides, as for example silicates or borates of the said oxides. Activating additions may also be made to the said catalysts, such for example as additions of small amounts of copper sulphate or dark or light red phosphorus. This latter element may also itself be employed as a catalyst.

The said treatment is usually carried out by passing the butylene glycol in a vaporous state and mixed with water vapor over the catalyst. The process may be carried out under ordinary, reduced, or under somewhat elevated pressure. Other extraneous gases such as nitrogen may also be added to the mixtures to be treated.

As examples of elevated temperatures suitable for application in the process according to the present invention may be mentioned 160° to 500° C. but preferably temperatures of between 250° and 320° C. The employment of water vapor has the great advantage that in the decomposition of the butylene glycols the formation of undesirable by-products is suppressed to a very considerable extent and thus a very high yield of the reaction product is obtained and this is moreover very pure. The quantity of water vapor employed may be varied within wide limits. Thus for example for 1 part by weight of the butylene glycol employed, ½ to 10 parts by weight of water vapor may be mentioned as being advantageous although greater or smaller amounts of water vapor may also be employed. The most advantageous range has been found to be that of between about 1 to 4 parts by weight of water vapor for each part of the butylene glycol treated.

The following examples will further illustrate the nature of this invention but the invention is not restricted to these examples. The parts are by weight.

Example 1

In three experiments, (1) 1.3-butylene glycol vapor alone, (2) 80 per cent of 1.3-butylene glycol vapor together with 20 per cent of water vapor and (3) 30 per cent of 1.3-butylene glycol vapor together with 70 per cent of water vapor, is passed at a temperature of about 290° C. over a catalyst prepared by impregnating pumice with phosphoric acid. Each 100 parts of 1.3-butylene glycol employed is converted in the three experiments as follows:

1. 55.3 parts into butadiene and 23.5 parts into oily by-products.
2. 60.0 parts into butadiene and 18.5 parts into oily by-products.
3. 65.0 parts into butadiene and 13.5 parts into oily by-products.

Example 2

If active alumina be employed in the operation according to Example 1 in place of the catalyst therein mentioned and at a temperature of about 300° C. the following yields are obtained in corresponding operations:

1. 27 per cent
2. 33 per cent of the theoretical yield
3. 65 per cent

This yield may be increased by activating the said active alumina by treatment with a small amount of copper sulphate.

Example 3

If butylene glycol vapor be passed over a catalyst comprising aluminum silicate at a temperature of about 270° and 280° C. a fairly good yield of butadiene is obtained. The said yield may be increased by about 30 to 35 per cent by an addition of water.

Example 4

A very considerable yield of butadiene is obtained by passing butylene glycol at a temperature of about 300° C. over a catalyst prepared by soaking pumice stone with thorium nitrate and heating. The said yield of butadiene may be increased by 30 to 35 per cent by an addition of water vapor.

Example 5

If operations corresponding to those described in Examples 1 and 2 be carried out with a catalyst prepared by applying red or light-red phosphorus to pumice stone and at a temperature of about 270 to 280° C. each 100 parts of the 1.3-butylene glycol employed is converted in the three experiments as follows:

1. 49 parts into butadiene
2. 63 parts into butadiene
3. 72.5 parts into butadiene The advantages to be obtained by an addition of water vapor will be clear from all of the above examples.

The term "solid oxide dehydration catalyst" as used in the claims is to be interpreted to include not only solid oxides added to the reaction mixture, as such, but also solid oxides produced in the reaction mixture as a result of the decomposition under the reaction conditions of corresponding decomposable oxygen-containing compounds, such as, hydroxides, carbonates, nitrates and oxalates.

What I claim is:—

1. A process for the production of diolefines which comprises passing a butylene glycol together with an addition of water vapor at a temperature between 160 and 500° C. over a solid oxide dehydration catalyst.

2. A process for the production of butadiene which comprises treating butylene glycol together with an addition of water vapor at a temperature between 160 and 500° C. with a solid oxide dehydration catalyst.

3. A process for the production of diolefines which comprises treating a butylene glycol together with an addition of ½ to 10 parts, by weight, of water vapor for each part of the butylene glycol treated at a temperature between 160 and 500° C. with a solid oxide dehydration catalyst.

4. A process for the production of diolefines which comprises treating a butylene glycol together with an addition of water vapor at a temperature of between 160 and 500° C. with a solid oxide dehydration catalyst.

5. A process for the production of diolefines which comprises treating a butylene glycol together with an addition of water vapor at a temperature of between 250 and 320° C. with a solid oxide dehydration catalyst.

6. A process for the production of diolefines which comprises treating a butylene glycol together with an addition of water vapor at a temperature between 160 and 500° C. and at a reduced pressure with a solid oxide dehydration catalyst.

7. A process for the production of diolefines which comprises treating a butylene glycol together with an addition of water vapor at a temperature between 160 and 500° C. with a solid oxide dehydration catalyst activated by an addition of a substance selected from the class consisting of copper sulphate and red phosphorus.

8. A process for the production of diolefines which comprises treating a butylene glycol together with an addition of water vapor at a temperature between 160 and 500° C. with a solid oxide dehydration catalyst and an activating addition essentially comprising copper sulphate.

MARTIN MUELLER-CUNRADI.

---

CERTIFICATE OF CORRECTION.

Patent No. 1,944,153.  January 23, 1934.

MARTIN MUELLER-CUNRADI.

It is hereby certified that error appears in the printed specification of the above numbered patent requiring correction as follows: Page 1, line 85, of Example 2, for "800°C." read 300°C.; and that the said Letters Patent should be read with this correction therein that the same may conform to the record of the case in the Patent Office.

Signed and sealed this 7th day of August, A. D. 1934.

Leslie Frazer (Seal)  Acting Commissioner of Patents.